United States Patent
Armenta

(12) 
(10) Patent No.: US 6,608,894 B1
(45) Date of Patent: Aug. 19, 2003

(54) LOGGING TAP FOR DIGITAL TELEPHONE LINES

(76) Inventor: Manuel Armenta, 2105 Los Rios Blvd., Plano, TX (US) 75074

( * ) Notice: Subject to any disclaimer, the term of this patent is extended or adjusted under 35 U.S.C. 154(b) by 0 days.

(21) Appl. No.: 09/490,953

(22) Filed: Jan. 24, 2000

(51) Int. Cl.[7] .............................................. H01R 25/00
(52) U.S. Cl. ........................ 379/231; 439/650; 439/651
(58) Field of Search ................................. 379/231, 229, 379/230, 232; 439/638, 709, 650, 651, 571

(56) References Cited

U.S. PATENT DOCUMENTS

| | | | | |
|---|---|---|---|---|
| 4,087,648 A | * | 5/1978 | Giacoppo | 439/76 |
| 4,925,393 A | * | 5/1990 | Ingalsbe | 439/76 |
| 6,379,189 B2 | * | 4/2002 | Sakai et al. | 439/651 |

OTHER PUBLICATIONS

Product Information Excerpt (4 pages) for Item No. MRI, 320, a recording interface supplied by Dees Communications Engineering, Redmond, WA. 98052.

Product Information Excerpt (6 pages) for a recording interface supplied by MCK Communications, Inc., Newton, MA 02158.

* cited by examiner

*Primary Examiner*—William J. Deane, Jr.
(74) *Attorney, Agent, or Firm*—Howison & Arnott, LLP; Gregory M. Howison

(57) ABSTRACT

The logging tap disclosed and claimed herein provides for the direct connection of a plurality decoder units having a plurality of digital-to-analog converter inputs to a plurality of digital telephone signal lines in telephone logging applications without requiring a separate wide band, shielded cable from the bridging tap device to the decoder unit. The logging tap comprises a decoder unit supported on a planar substrate and having a plurality of digital-to-analog converters, an input terminal for coupling each of the input digital telephone signals to a corresponding DAC circuit and an output terminal for coupling the output analog signal of the corresponding DAC circuit to a recording device; A type 66 block is provided for bridging at least one of the plurality of digital telephone lines coupling a PBX to a subscriber's digital telephone devices. An adapter is provided for connecting each of the ID pins of the first row of the type 66 block to a corresponding input terminal of the DAC circuit and each of the ID pins of the second row of the type 66 block to a corresponding output terminal of the DAC circuit.

6 Claims, 2 Drawing Sheets

LOGGING TAP FOR DIGITAL TELEPHONE LINES

TECHNICAL FIELD OF THE INVENTION

The invention disclosed and claimed herein generally relates to telephone logging equipment and more particularly to apparatus for bridging a digital telephone line and converting the digital signals to analog signals for logging purposes.

BACKGROUND OF THE INVENTION

The logging of telephone calls by businesses has long been utilized for purposes of quality control, training new employees, archival recording or simply the monitoring of telephone calls. Such logging activity is typically carried on by businesses engaged in telemarketing, sales and customer service, transactions with financial institutions such as stock brokers and banks or insurance companies, and in numerous other applications where it is desired to preserve the information being communicated during telephone calls. The kind of telephone system typically utilized by such business organizations includes a PBX or other call switching and control device which is typically coupled through a plurality of telephone lines to individual telephone sets used in the various offices of the organization. The PBX is typically a digital device as are the individual telephone devices connected to the PBX. Therefore the signals that are coupled between these devices travel on digital signal lines.

In order to log calls occurring on these digital signal lines, it is necessary to provide a bridging tap to tap into each individual line while maintaining line continuity and route the signal through another digital telephone signal line to a decoder unit which may comprise a digital-to-analog converter (DAC) for each digital line capable of being monitored. Each DAC converts the monitored digital telephone signal into an analog form so that it may be conveniently logged or recorded by an analog recording device. Thus, when listening to the signals that have been logged by the above described apparatus, a person may understand the conversation directly.

The principle components of a logging apparatus includes the bridging tap device and a decoder unit (which may include the individual DAC circuits), and a wide band, shielded cable of substantial length running between the bridging tap and the decoding unit. The bridging tap is typically part of the distribution frame for the plurality of digital telephone lines. However, the wide band, shielded cable that routes the tapped digital telephone signals to a decoder unit and the decoder units are typically mounted in back plane assemblies which are usually mounted in equipment cabinets which occupy considerable space and requires substantial technical skill for installation and maintenance. Moreover, the wide band signals are susceptible to noise, distortion and interference that arise because of the broad band nature of the digital tapping cable running between the bridging taps and the decoder units as well as the termination impedance mismatches or connector integrity problems that may occur at each termination of a wide band cable.

Thus, what is needed is a simpler logging tap system which eliminates the wide band cables required to connect the bridging taps to the decoder units and minimize the opportunities for noise, distortion and interference or unreliability of connections that may occur in the prior art system. Moreover, a system needing these requirements would also be easier to install and maintain as well as providing for much simplified retrofitting of logging systems as the business organization having the telephone system expands.

SUMMARY OF THE INVENTION

There is provided according to the present disclosure a logging tap for the direct connection of decoder unit having a plurality of digital-to-analog converter DAC inputs to a plurality of digital telephone signal lines in telephone logging applications. The logging tap comprises a decoder unit supported on a planar substrate and having a plurality of DAC circuits, an input terminal for coupling each of the input digital telephone signals to a corresponding DAC circuit input and an output terminal for coupling the analog signal output of the corresponding DAC circuit to a recording device for logging; a type 66 block having first and second rows of insulation displacement pins disposed as circuit pairs in each said first and second row, each circuit pair for bridging at least one of the plurality of digital telephone lines coupling a PBX to one of a plurality of a subscriber's digital telephone devices; and an adapter having a first plurality of extension terminals for connecting each of the ID pins of the first row of terminals of the type 66 block to a corresponding input terminal of the corresponding DAC circuit and having a second plurality of extension terminals for connecting each of the ID pins of the second row of terminals of the type 66 block to a corresponding output terminal of the corresponding DAC circuit.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
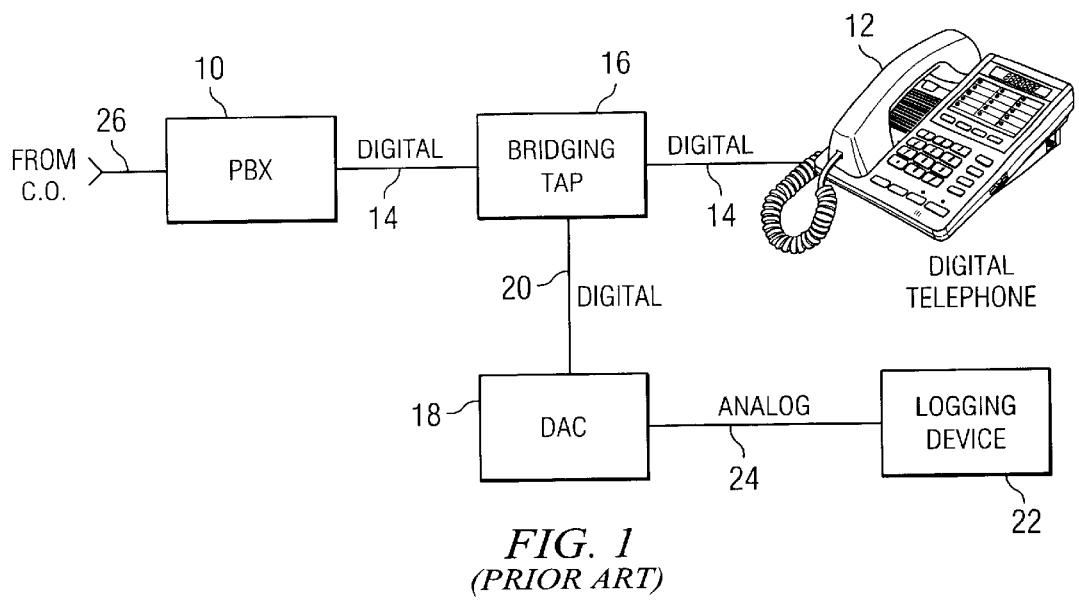
FIG. 1 illustrates a block diagram of telephone logging apparatus as found in the prior art.

Referring now to FIG. 1, there is illustrated a block diagram of telephone logging apparatus as it is used in the prior art. The apparatus is illustrated in a bridging configuration upon a digital telephone line such as typically found in a telephone system utilizing a PBX and a number of digital telephone devices connected thereto. A PBX 10 is typically coupled to a plurality of digital telephone devices 12 through a digital telephone line 14. In the example shown in FIG. 1, a single digital telephone line 14 is coupled to a single digital telephone set 12. It will be understood, that in the typical system, a plurality of such digital telephone devices 12 will be individually coupled with the PBX 10 over a plurality of digital telephone lines 14. The PBX 10 is coupled to and receives/transmits telephone signals along telephone line 26.

Continuing with FIG. 1, a bridging tap 16 is shown coupled to the digital telephone line 14 for the purpose of tapping into the signal present on the digital telephone line 14 and outputting the digital telephone signals present on the digital telephone line 14 to a digital-to-analog converter along a digital tap line 20. The digital tap line 20 is similar to the digital telephone line 14 and carries a duplicate of the signals appearing on the digital telephone line 14. A digital-to-analog converter 18 converts the digital signals to an analog form in the voice band and outputs them to a logging device 22 along an analog signal line 24. The logging device 22 may be of any form suitable for recording voice band analog signals including voice signals, control signals, e.g., DTMF tones and the like. For example, it may be a tape recorder or it may be a digital recording device. In a typical installation, the digital-to-analog converter 18 is a circuit card installed in a back plane and a cabinet (not shown) in an equipment bay located at some distance from the location of the bridging tap 16 in the user's telephone system. Thus, the digital tap line 20 may be of substantial length and thereby is susceptible to various types of distortion, interference and noise that may exist in a typical system. One of the reasons for this susceptibility is that digital signals are of much higher bandwidth than analog signals. Since susceptibility to noise, distortion and interference is proportional to the bandwidth of the signal of interest, a digital signal line such as digital tap line 20 will tend to pick up more noise than a narrow bandwidth signal line such as analog signal line 24. A further characteristic of the prior art system illustrated in FIG. 1 is the greater number of cable terminations involved. It is a problem because every time a signal line is terminated, increased opportunities for impedance mismatch and/or loss of connector integrity is presented to the system.

Figure 2:
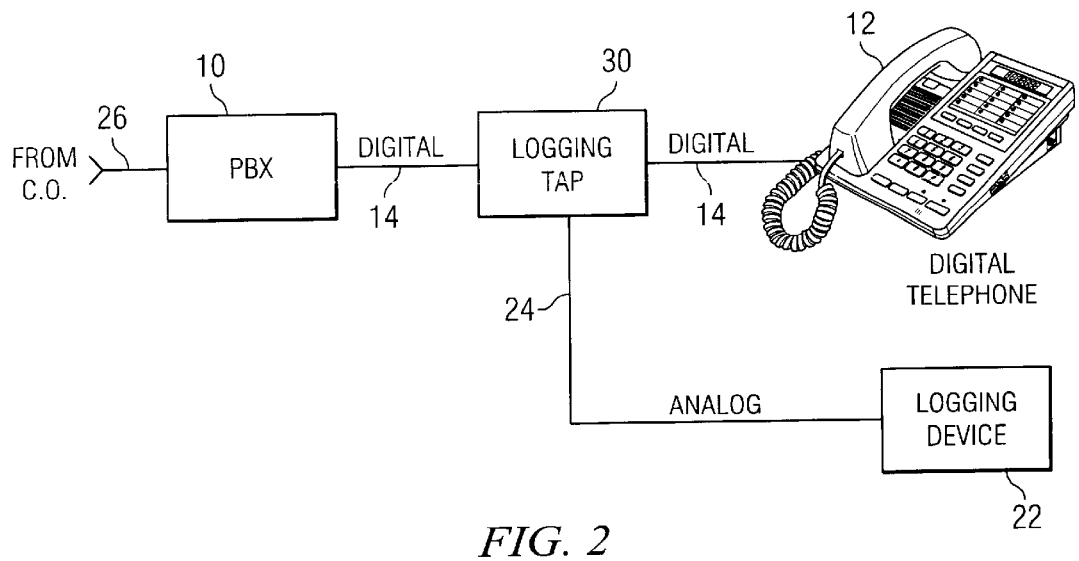
FIG. 2 illustrates a block diagram of a telephone logging tap according to the present disclosure.

Referring now to FIG. 2 there is illustrated a block diagram of a telephone logging tap apparatus according to the present disclosure. The PBX 10, the digital telephone device 12 the digital telephone line 14 of the user's telephone system and the telephone line 26 are the same as described hereinabove in conjunction with FIG. 1. In the logging apparatus of the present disclosure, a logging tap 30 is shown coupled to the digital telephone line 14 of the user's telephone system. The logging tap 30 may be referred to elsewhere in this description as a telephone logging tap 30 or a logging tap/decoder 30. The logging tap 30 has an output coupled to a logging device 22 along an analog signal line 24. The logging device 22 and the analog signal line 24 are similar in function to those described hereinabove in conjunction with FIG. 1. It will be appreciated that the logging tap 30 combines the functions of the bridging tap 16, the digital-to-analog converter 18 and the digital tap line 20 as found in the prior art illustrated in FIG. 1. It will further be appreciated that combining these structures within a single unit, the logging tap 30, eliminates the noise, distortion and interference that may be caused by the broad band characteristics of the digital tap line 20 or the cable termination characteristics associated with the digital tap line 20 as previously described. The logging tap 30 is a compact unit which occupies very little additional space compared to a typical prior art bridging tap 16. Moreover, the logging device 22 is directly connected to the logging tap 30 via the analog signal line 24 which is a narrow bandwidth signal path. The logging tap 30 of the present disclosure as illustrated in FIG. 2 thus not only occupies considerably less space (because the equipment rack, back plane and separate stand alone circuits and hardware are not needed) but also substantially reduces the susceptibility of the system to noise, distortion and interference. Persons skilled in the art will also appreciate that the logging tap 30 of the present disclosure is much easier to install and in fact can be easily retrofitted to existing systems because the bridging tap portion of the logging tap 30 is installed on the same type of terminal block assembly used to provide the bridging tap as will be described in further detail hereinbelow.

Figure 3:
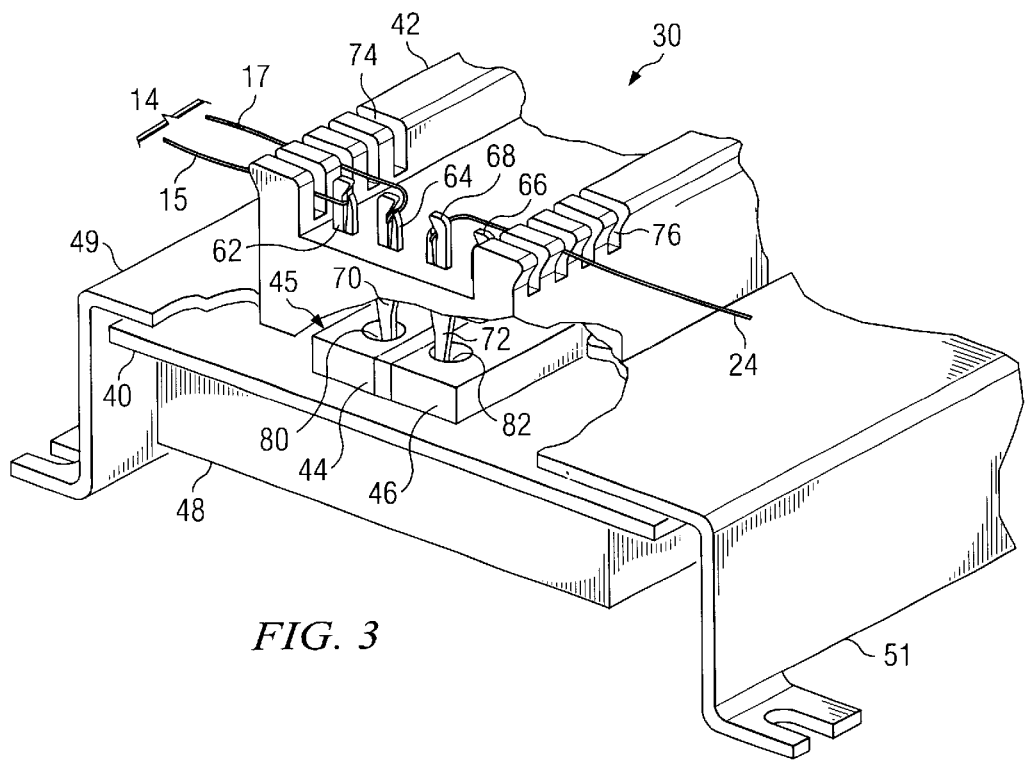
FIG. 3 illustrates a perspective pictorial drawing of an embodiment of a logging tap according to the present disclosure.

Referring now to FIG. 3, there is illustrated a pictorial perspective drawing of a portion of an embodiment of the logging tap 30 of the present disclosure. There is shown a planar substrate 40 having a plurality of digital-to-analog converter (DAC) circuits represented collectively as decoder unit 48 attached thereto. The decoder unit 48 may include a programmable controller (not shown) which operates according to a program and is operatively coupled to the plurality of DAC circuits in the decoder unit 48. The controller may monitor the status of or control the operation of (or both) the logging operations performed by the logging tap 30. The decoder unit 48 may further include a signal generator (not shown) for generating DTMF or other voice band signaling tones for use in signal control and monitoring instructions. Further, a communication port, such as an RS-232 terminal, may be provided for uploading or downloading programs to the controller or for revising the controller programs. The planar substrate 40 is coupled with a type 66 block 42 by means of an adapter 45 having a first plurality of terminals 44 and a second plurality of terminals 46. A housing 49, 51 attached to the type 66 block 42 is provided for enclosing the planar substrate 40 and the decoder unit 48. The type 66 block 42 and the housing 49, 51 are shown partially cut away to expose several features the type 66 block 42 and the adapter 45.

Continuing with FIG. 3, several features of the type 66 block are illustrated in representative form. The wiring terminals used in the type 66 block 42 are structured as pairs of insulation displacement pins disposed as 24 circuit pairs in each of a first and second row of such terminals in the type 66 block 42. Only the first pair of ID pins in each of the first and second rows are shown in FIG. 3 for purposes of clarity. Terminal 62 and terminal 64 represents a pair of ID pins which are coupled together within the type 66 block 42 and a common pin 70. Similarly, terminal 66 and terminal 68 represent a pair of ID pins coupled together within type 66 block 42 and also to a common pin 72. These ID pin assemblies will be described in detail further hereinbelow. Digital telephone line 14 has an input line 15 and an output line 17 as shown in FIG. 3. Input line 15 is shown connected to ID pin 62 and output line 17 is shown connected to ID pin 64. The fact that ID pin 62 and ID pin 64 are coupled together to common pin 70 ensures the continuity of both the input 15 and the output 17 portions of digital telephone line 14 is maintained when the logging tap 30 of the present disclosure is installed on a customer's main distribution frame (MDF) (not shown in FIG. 3). This continuity is ensured because each pair of ID pins, 62, 64, and the associated common pin, e.g., common pin 70, are formed of a single piece of metal as will be described further hereinbelow. The pair of ID pins 62, 64 represent the input terminal of the logging tap 30 of the present disclosure. The output terminal of the logging tap 30 is represented by ID pins 66, 68 which are coupled together to common terminal 72. Connected to ID pin 68 is an analog signal line 24 (as previously described) to connect the output of the logging tap 30 to a logging device 22. The logging device 22 may illustratively be a voice band recorder. Each of the wires of the digital telephone line 14 and the analog signal line 24 pass through a guide slot associated with each of the ID pins 62, 64, 66 and 68. For example, the output line 17 of the digital telephone line 14 passes through a slot 74 in the side of the type 66 block 42. Similarly, the analog signal line 24 passes through a slot 76 in the opposite side of the type 66 block 42.

Continuing with FIG. 3, there is illustrated an adapter 45 having a first plurality of terminals 44 and a second plurality of terminals 46. The first plurality of terminals 44 and the second plurality of terminals 46 correspond to first and second rows of the common pins 70, 72 of each of the pairs of IDC pins in the first and second rows of the 24 circuit pair terminals of the type 66 block 42. The first plurality of terminals 44 includes a row of receptacles as represented by a receptacle 80 which is one of a row of receptacles in the first plurality of terminals 44 wherein one receptacle corresponds to each common pin of each pair of IDC-terminals in the type 66 block 42. Similarly, the second plurality of terminals 46 includes a row of receptacles 82, one receptacle corresponding to each common pin of the pair of IDC pins forming the second row of terminals. Each of the first plurality of terminals 44 and the second plurality of terminals 46 may illustratively be a spring tension terminal strip having through-hole solder pins for coupling respectively between the ID pins (i.e., the Y-connector terminals) of the 66 block 42, and the input pins or terminals 62, 64 and the output pins 66, 68 or terminals of the decoder unit 30. The receptacles 80, 82 and the corresponding first and second plurality of terminals 44, 46 together provide mechanical decoupling of the ID pin assemblies and the PC board terminal (to be described herein below in conjunction with FIG. 4) when wiring is installed on the ID pins. A mechanized wiring device is typically used during wiring installation which imparts considerable impact forces to the ID pin. This force is substantially absorbed by the adapter 45 assembly, thus preventing damage to the planar substrate 40. Returning to FIG. 3, the first row of insulation displacement terminals represented by IDC pin 62 and IDC pin 64 correspond to the row of terminals assigned to receive the input digital telephone line signals from a plurality of circuits that may be connected to the first row of terminals in the type 66 block 42. In like fashion, the second adapter corresponds to the second row of terminals in the type 66 block and this row of terminals is used for the corresponding output circuit connections from the logging tap 30 to the corresponding logging device 22 coupled to each audio signal line 24 for each of the digital telephone lines that will be connected for logging or monitoring by the logging tap 30 of the present disclosure.

Figure 4:
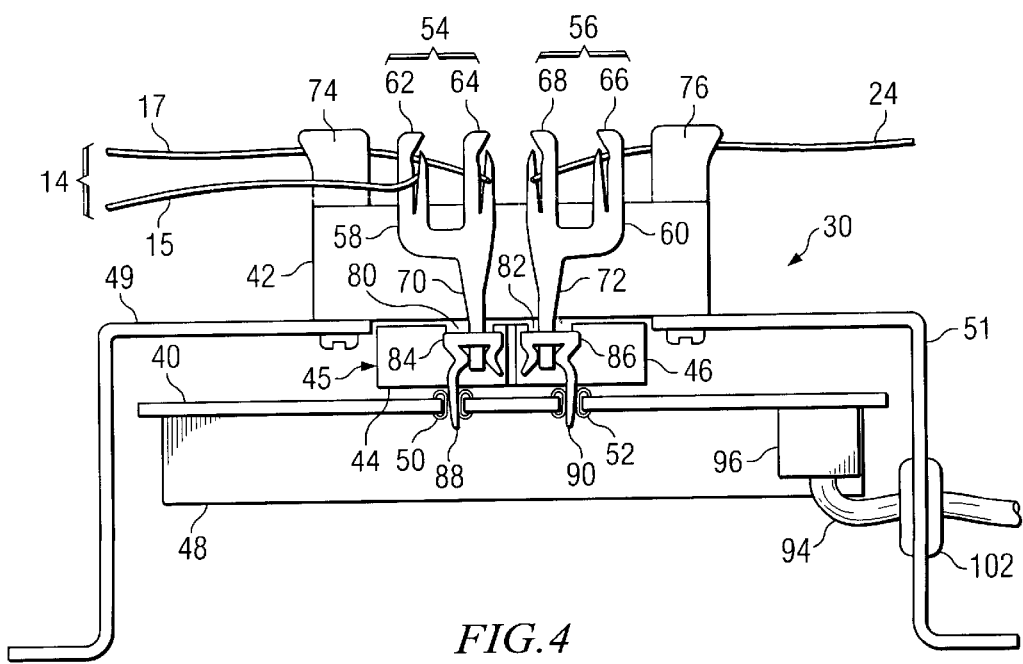
FIG. 4 illustrates an end view of the embodiment illustrated in FIG. 3.

Referring now to FIG. 4, there is illustrated an end view of the logging tap 30 of the present disclosure similar to that illustrated in FIG. 3 but showing a section of the logging tap 30 to illustrate how the input connections from the digital telephone line 14 are coupled to the input terminals 50 of the decoder unit 48 via the input pins 62, 64 and also how the output signals from the decoder unit 48 are coupled through the output pins 68 to the audio signal lines 24. Structural components in FIG. 4 which are the same as the structural components shown in FIG. 3 have been assigned the same reference numbers. The planar substrate 40 is attached to the decoder unit 48 which contains a plurality of digital-to-analog converter circuits used in converting the signals on the digital telephone line 14 to analog signals on the analog signal line 24 to enable recording of the signals present on the digital telephone lines 14. In the decoder unit 48, one digital-to-analog converter (DAC) circuit is associated with each incoming digital telephone line 14 and one outgoing analog signal line 24.

The bridging tap 30 shown in FIG. 4 includes a type 66 block 42 having first and second rows of insulation displacement terminals disposed as 24 circuit pairs in each of the first and second rows. The end terminal pair of the first row 54 is represented by a Y-connector terminal 58 and the second row of insulation displacement terminals is represented by a Y-connector 60 shown in FIG. 4. Each Y-connector terminal 58 and Y-connector terminal 60 comprises a pair of insulation displacement pins, ID pin 62 and ID pin 64 which are connected together to common pin 70 as shown in FIG. 4. Similarly, Y-connector terminal 60 is comprised of ID pin 66 and ID pin 68 which are coupled together and to common pin 72 to form the Y-connector terminal 60 in the second row 56 of the ID terminals of type 66 block 42. The Y-connector terminal 58 represents the input terminal of the type 66 block and the Y-connector terminal 60 represents the output terminal of the type 66 block 42. As in FIG. 3, the input signal from the digital telephone line 14 is brought in along input line 15 to the ID pin 62 and the digital telephone line 14 is continued back to the digital telephone line circuit 14 along the output line 17, thus providing continuity between the PBX 10 and the digital telephone 12 in the user's telephone circuits. Similarly as also shown in FIG. 3 hereinabove, the audio signal provided at the output terminal of the type 66 block which is at the Y-connector terminal 60 is shown connected to the ID pin 68 along the audio signal line 24 to the logging device 22.

Continuing further with FIG. 4, there is shown an end view of each of the first adapter 44 and the second adapter 46 which provides the interface between the first and second rows of insulation displacement terminals in the type 66 block and the corresponding input and output circuits of the DAC circuits within the decoder unit 48. The planar substrate 40, which may be a printed circuit board upon which the circuit components of the decoder unit 48 are installed includes an input terminal 50 and an output terminal 52 for each individual digital-to-analog converter circuit (not shown). The coupling of the input signals and the output signals from the decoder unit 48 is provided by respective receptacles 50, 52 contained in the first plurality of terminals 44 and the second plurality of terminals 46. For example, the input circuit that is present on the common terminal 70 of the input digital telephone line circuit is coupled through receptacle 84 of the first plurality of terminals 44 into the input terminal 50 of the planar substrate 40 to provide the input signal to the corresponding digital-to-analog converter circuit in the decoder unit 48. Similarly, the output signal from the digital-to-analog converter for the corresponding circuit is provided from terminal 52 on the planar substrate 40 through receptacle 86 which is part of the second plurality of terminals 46. This signal thereupon is coupled from the receptacle 86 to the common pin 72 of the output terminal of the type 66 block 42. As described previously, the first and second plurality of terminals 44, 46 provide the electrical connection of the type 66 block with the decoder unit 48 as well as the mechanical decoupling necessary to prevent damage to the planar substrate 40 during the installation of signal wires on the ID pins of the type 66 block.

It will be appreciated in reference to FIG. 4 that the structure illustrated provides for direct connection of the decoder unit 48 to the respective input and output circuits of the logging tap 30. The logging tap 30 is installed as a unit merely by attached it to the main distribution frame and installing the input and output wiring thereto. There is no need for running a wide band, shielded tapping cable (see the digital tap cable 20 in FIG. 1) from the type 66 block or the conventional sort of bridging tap and the remotely located decoder units as is found in typical systems of the prior art. Instead, in the bridging tap of the present disclosure, the shielded wide band cable is eliminated and the connections are made both for the inputs and the outputs directly to the decoder unit 48 for converting the input digital telephone signals to analog signals that may be recorded. The output line is a conventional narrow band analog signal line 24 as previously described. Also shown in FIG. 4 is a connection for a DC power supply provided by cable 94 which is shown connected to planar substrate 40 by connector 96. The power supply cable 94 may be passed through a strain relief 102 shown in housing 51 as illustrated in FIG. 4.

Although the preferred embodiment has been described in detail, it should be understood that various changes, substitutions and alterations can be made therein without departing from the spirit and scope of the invention as defined by the appended claims.

What is claimed is:

1. A logging tap for direct connection of a plurality of digital-to-analog converter (DAC) circuits to a plurality of digital telephone signal lines in logging applications, comprising:

a decoder unit comprising a plurality of said DAC circuits, each said DAC circuit having an input terminal for receiving a digital telephone signal and an output terminal for transmitting an analog telephone signal to a logging device, said DAC circuits and said input and output terminals disposed on a planar substrate;

a type 66 block having first and second rows of insulation displacement (ID) pins disposed as circuit pairs in each said first and second row, wherein a circuit pair of said first row provides for bridging at least one of a plurality of said digital telephone lines coupling a PBX to one of a plurality of a subscriber's digital telephone devices and wherein a circuit pair of said second row provides for coupling said analog telephone signal to said logging device;

an adapter having a first plurality of extension terminals for coupling said plurality of input terminals of said decoder unit to said type 66 block wherein each said ID pin of said first row of circuit pairs of said type 66 block is connected via one of said extension terminals to a corresponding said input terminal of a corresponding DAC circuit and having a second plurality of extension terminals for coupling said plurality of output terminals of said decoder unit to said type 66 block wherein each said ID pin of said second row of circuit pairs of said type 66 block is connected via one of said extension terminals to a corresponding said output terminal of said corresponding DAC circuit.

2. The apparatus of claim 1, wherein said decoder unit further comprises:

a controller operating under control of a program and operatively coupled to said plurality of DAC circuits for performing status and control of said logging applications;

a signal generator for generating DTMF tones for signaling control instructions; and a communication port for loading and revising said program.

3. The apparatus of claim 1, wherein said logging device comprises a voice band recorder.

4. The apparatus of claim 1, wherein said planar substrate comprises a printed circuit board.

5. The apparatus of claim 1, wherein said ID pins comprise a Y-connector terminal.

6. The apparatus of claim 1, wherein each said first and second plurality of terminals comprises a spring tension terminal strip having through hole solder pins for coupling respectively between said ID pins of said 66 block and said input terminals and output terminals of aid decoder unit.

* * * * *